United States Patent [19]

Abthoff et al.

[11] Patent Number: 4,622,809
[45] Date of Patent: Nov. 18, 1986

[54] METHOD AND APPARATUS FOR MONITORING AND ADJUSTING λ-PROBE-CONTROLLED CATALYTIC EXHAUST GAS EMISSION CONTROL SYSTEMS OF INTERNAL COMBUSTION ENGINES

[75] Inventors: Jörg Abthoff, Pluederhausen; Hans-Dieter Schuster, Schorndorf; Gottfried Wollenhaupt, Stuttgart; Gunter Loose, Remseck; Michael-Rainer Busch, Ebersbach, all of Fed. Rep. of Germany

[73] Assignee: Daimler-Benz Aktiengesellschaft, Fed. Rep. of Germany

[21] Appl. No.: 720,686

[22] Filed: Apr. 8, 1985

[30] Foreign Application Priority Data

Apr. 12, 1984 [DE] Fed. Rep. of Germany ....... 3413760

[51] Int. Cl.4 ............................................... F01N 3/20
[52] U.S. Cl. ......................................... 60/274; 60/276
[58] Field of Search ................................. 60/276, 274

[56] References Cited

U.S. PATENT DOCUMENTS 4,007,589 2/1977 Neidhard ............................. 60/276
4,251,989 2/1981 Norimatsu ............................ 60/276

FOREIGN PATENT DOCUMENTS 2735434 2/1978 Fed. Rep. of Germany ........ 60/276

Primary Examiner—Douglas Hart
Attorney, Agent, or Firm—Barnes & Thornburg

[57] ABSTRACT

A method for testing and adjusting catalytic exhaust gas emission control systems of internal combustion engines, in which the fuel-air-ratio is regulated by means of a λ-probe (control-probe) arranged in the exhaust gas stream upstream of the catalyst, whereby the exhaust gas stream is measured downstream of the catalyst by means of a further λ-probe (test-probe). The voltage average value and amplitude magnitude of the signal produced by the test-probe are determined and serve for adjusting the operating point of the control system and for the recognition of the catalyst efficiency.

10 Claims, 6 Drawing Figures

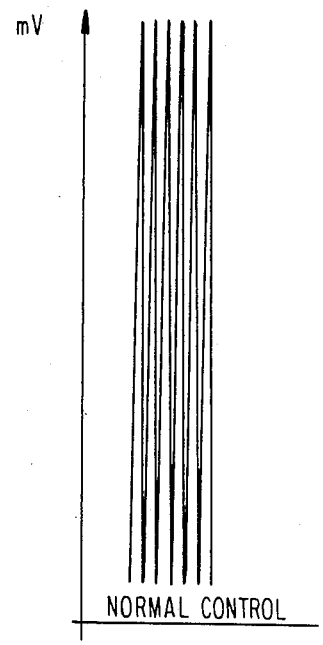
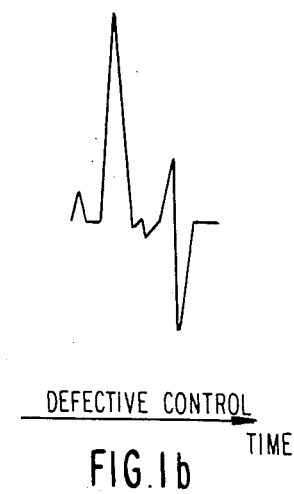
FIG.1a NORMAL CONTROL
FIG.1b DEFECTIVE CONTROL
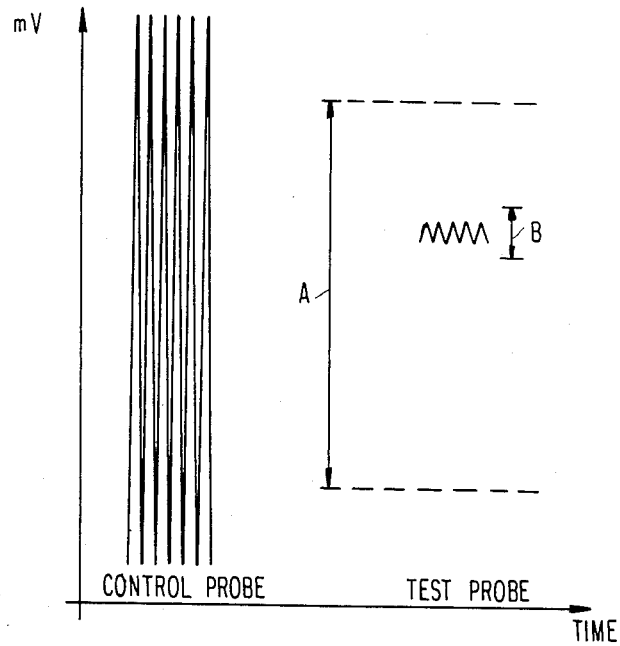
FIG.2

METHOD AND APPARATUS FOR MONITORING AND ADJUSTING λ-PROBE-CONTROLLED CATALYTIC EXHAUST GAS EMISSION CONTROL SYSTEMS OF INTERNAL COMBUSTION ENGINES

Internal combustion engines, especially motor vehicle engines, contain in their exhaust gas still combustible components such as carbon monoxide and noncombusted hydrocarbons as well as nitrous oxide. In order to reduce the proportion of these components to a minimum value as required by the law, the exhaust gases must be far-reachingly freed of these components. This means that the combustible components must be oxidized as completely as possible into carbon dioxide and water and the nitrous oxides must be reduced to nitrogen.

Such a conversion may take place, for example, in that one subjects the exhaust gases to an after treatment in catalysts. However, it is prerequisite for an optimum operation of the catalyst that the fuel-air-mixture combusted in the engine corresponds approximately to the stoichiometric ratio of air and fuel ($\lambda=1$). For that reason an electrochemical measuring sensor (λ-probe) is installed into the path of the exhaust gases upstream of the catalyst which measures, for example, the oxygen content in the exhaust gas and which effects by way of a control or regulating device in which the signal produced by the probe is processed, the correct adjustment of the fuel air-ratio and therewith also far-reachingly of the exhaust gas composition. This λ-probe is therefore referred to hereinafter also as "control probe". The known electrochemical measuring sensors of this type operate according to the principal of the oxygen concentration cell (λ-probe). They include therefore a reference electrode which is operatively connected with oxygen of a known, constant partial pressure. For example, the oxygen of the air may serve as such oxygen source, however, the reference electrode may also be operatively connected, for example, with a metal-metal oxide mixture such as iron/iron oxide, nickel/nickel oxide etc. (DE-AS No. 28 36 900) or with a CO-$CO_2$-mixture (DE-AS No. 24 43 037) or with carbon (DE-OS No. 29 17 265) for the purpose of adjusting a predetermined partial oxygen pressure. Generally a pipe of stabilized cubic zircon dioxide serves as ion conducting solid electrolyte. The solid electrolyte must be heated during the operation of the probe to a temperature of 400° C. to 600° C.

The fuel-air-ratio can be deduced from the voltage (EMK) produced by the λ-probe (control probe) by way of a characteristic line. The desired λ-regulating point is adjusted by way of adjustable electronic parameters such as threshold, operating point, integrator characteristic and delay periods. The regulator or controller connected to the probe operates generally as two-point or on-off regulator on the basis of the characteristic line, i.e. upon deviation of the produced voltage from the operating point the fuel component in the fuel-air-mixture is increased or decreased. The components to be removed of the exhaust gas, which possesses optimum composition for the catalytic conversion as a result of these control and regulating operations, are converted in the following catalyst practically completely into water, nitrogen and carbon dioxide. The operation of a λ-probe controlled regulation is generally known and is described extensively, for example, in: Gl/ ckler, "Advances in Closed Loop λ-Controlled Fuel Injection Systems Means To Meet Most Stringent Emission Levels", Proceedings International Symposium on Automotive Technology and Automation, ISATA 81, Stockholm, Sept. 7-11, 1981, Vol. 1, pages 308-326, published by Automotive Automation Limited, Croydon, England.

The aging of the λ-probe, as also the presence, for example, of hydrogen in the exhaust gas lead to a marked displacement of the characteristic curve of the λ-probe so that the catalyst is no longer acted upon with the exhaust gas optimum for the same and the exhaust of the motor vehicle increases in undesired exhaust gas components. Of course, the exhaust of undesired exhaust gas component also increases if the λ-probe is defective or if the catalyst is exhausted or the fuel preparation installation, for example, carburetor or fuel injection is out of adjustment.

The object of the present invention thus resides in finding a method which permits to recognize a displaced characteristic line of the λ-probe, respectively, an incorrect regulation and to adjust respectively readjust the operating point required for the optimum operation of the catalyst as well as to determine the efficiency of the exhaust gas catalyst or a defective λ-probe (control probe) respectively regulation.

The underlying problems are solved according to the present invention in that the fuel-air-ratio of the exhaust gas is measured downstream of the catalyst by means of a further λ-probe (test-probe) in which the amplitude and average value of the output signal are determined, in that with a deviation of the average value from a predetermined desired value the operating point of the control system is changed for such length of time until the test-probe has reached its desired value and in that upon exceeding a predetermined amplitude value, a signal is produced for exchanging the catalyst.

These and other objects, features and advantages of the present invention will become more apparent from the following description when taken in connection with the accompanying drawings which show, for purposes of illustration only, one embodiment of a method in accordance with the present invention, and wherein:

FIG. 1a is a diagram illustrating the signal produced by an intact control-probe;

FIG. 1b is a diagram of a signal produced by a defective control-probe;

FIG. 2 is a diagram illustrating the signal of the control probe with the associated signal of the test-probe in case of a correct adjustment of the fuel-air-ratio;

As already described hereinabove, the regulator or controller connected to the probe operates as two-step or on-off controller, i.e. with a lack of oxygen in the exhaust gas the fuel supply is reduced and with an oxygen excess the fuel supply is increased. By reason of the inertia of the system and of the manner of operation of a two-step controller, the composition of the exhaust gas oscillates between a value lying slightly above and slightly below the value corresponding to the adjusted fuel-air-ratio, whereby the average value of the oscillations corresponds to the adjusted fuel-air-ratio. The control probe voltage then oscillates correctly and regularly from a high to a low value as illustrated in FIG. 1a. These regular correct oscillations also are present at the control-probe in the case when the operating point of the regulation (center position) has been displaced for any reasons. The control or regulating operation then proceeds as such still orderly, however, the result of the regulation no longer corresponds to the desired fuel-air-ratio but is displaced into the rich or lean region. Only with a defect of the control-probe, an incorrect irregular signal results as is illustrated in FIG. 1b.

According to the present invention the exhaust gas stream is measured anew downstream of the catalyst as viewed in the flow direction by a further λ-probe, the test-probe. Conditioned on the conversion of the exhaust gases in the catalyst, with a correct operation of the exhaust gas emission control system, the test-probe produces a signal which is markedly different from the signal of the control-probe. The amplitude of the signal of the test-probe is considerably smaller than the amplitude of the signal of the control-probe—in the ideal case equal to zero—and the average voltage of the signal of the test-probe corresponds to the actual residual oxygen content of the exhaust gas.

FIG. 2 illustrates with the correct functioning of the exhaust gas emission control system, the signal of the control-probe with its large amplitude and adjacent thereto the signal of the test-probe with a small amplitude.

Figure 3:
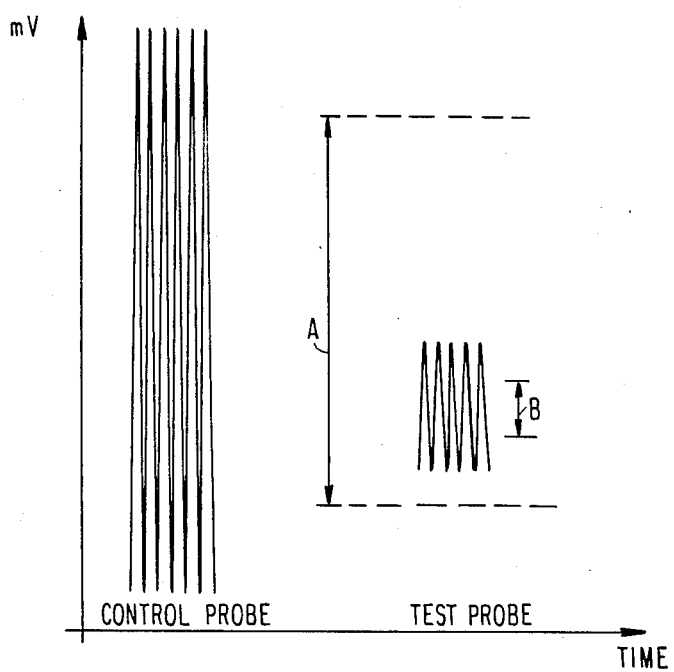
FIG. 3 is a diagram illustrating the signal of the control-probe and of the test-probe signal in case of a defective catalyst.

The smaller the amplitude of the signal of the test-probe, the more complete has been the conversion of the exhaust gases in the catalyst. The amplitude becomes larger to the same extent that the catalyst loses in efficiency. One can determine very easily for a given probe type, beginning with which amplitude magnitude the catalyst has lost its effectiveness to such an extent that the required exhaust gas values can no longer be maintained. If one now measures the exhaust gas of an exhaust gas emission control system to be tested by means of a test-sensor of the same type under the operating conditions required for the probe, such as the probe temperature, etc., and if one obtains a signal whose amplitude exceeds the permissive amplitude magnitude and is larger than that at which the effectiveness of the catalyst is still sufficient, then the catalyst has to be exchanged. This maximum permissive amplitude magnitude of the test-probe signal is indicated in FIG. 2 by the letter B. FIG. 3 illustrates a test-probe signal whose amplitude has exceeded the maximum permissive magnitude B, i.e. the catalyst is exhausted.

By means of a simple comparison circuit of known type the determined amplitude value is now compared with the maximum permissive amplitude value B. If the permissive amplitude magnitude B is exceeded, a warning tone or a light signal is produced by conventional means which calls attention to the required catalyst exchange. However, as is also particularly advantageous, the difference between the determined and the maximum permissive amplitude magnitude can be indicated by known means so that, for example, with a suitable conversion (scale) the efficiency of the catalyst can be directly indicated at any time with the values between 100% (amplitude=0: fully operable) and 0% (amplitude≧larger B: need of exchange).

Figure 4:
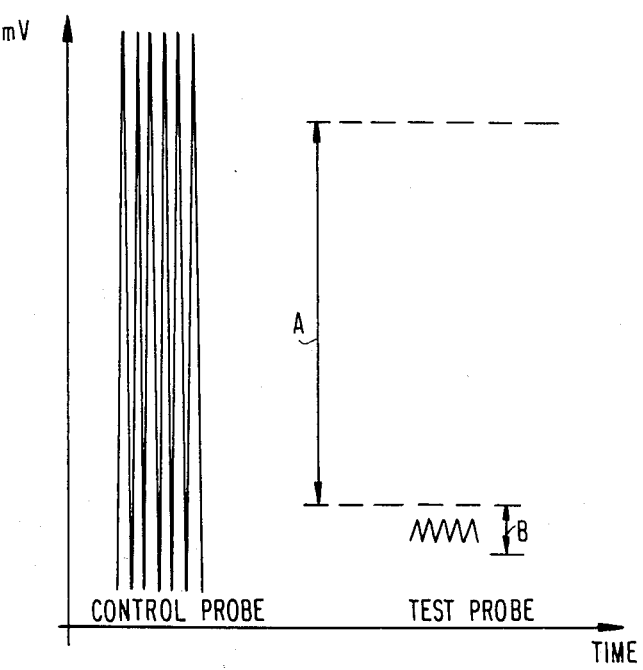
FIG. 4 is a diagram illustrating the signal of the control-probe and the test-probe signal with a displaced characteristic control line and FIG. 5 is a schematic view of a λ-probe-controlled catalytic exhaust gas emission control system of an internal combustion engine in accordance with the present invention.

The components to be removed from the exhaust gas are practically completely converted by the action of the catalyst, insofar as it is intact, and the average value of the voltage of the test-probe corresponds accurately to the actual exhaust gas composition. Since the fuel-air-ratio conditioned by the optimum operating range of the catalyst, is predetermined within a certain range, also the composition of the exhaust gas downstream of the catalyst must lie within a certain range. This, in turn, corresponds to a certain range of the average value of the voltage produced by the test-sensor (EMK). This range is indicated in FIGS. 2 to 4 with the letter A. If the exhaust gas has the proper composition, then the voltage (average value) produced by the test-sensor lies within this range A as shown in FIGS. 2 and 3. FIG. 3 thereby illustrates that even though the control-probe operates correctly, the catalyst nonetheless has to be exchanged. If the characteristic line of the control-probe is now displaced, be it, for example, as a result of aging or owing to hydrogen components in the exhaust gas at the probe or if the composition of the exhaust gas changes as a result of changes of the control circuit (electronics, adjusting members, etc.), then the control system continues to operate still apparently correctly; however, the exhaust gas downstream of the catalyst no longer has the desired composition. This situation is illustrated in FIG. 4. The signal produced by the test-probe lies outside of the permissive range A, even though the catalyst as such operates quite correctly (amplitude magnitude of the test-probe signal within the permissive range B). The operating point of the control installation is now displaced so far by means of a suitable electronic circuit of known type until the voltage (EMK) produced by the test-sensor again lies within the range A (desired value). This interengagement may of course also take place manually by adjustment of an adjusting potentiometer or of a mechanical element in the regulator. if it is not possible to bring the test sensor voltage again within the range A (desired value), then the control sensor should be exchanged. If even under these circumstances the test-probe voltage does not reach the desired value, then another defect exists in the exhaust gas emission control system, for example, a leakage in the exhaust gas connection or a defect in the electronic circuitry.

The test sensor can be fixedly installed in the exhaust connection downstream of the exhaust gas catalyst but may also be inserted only temporarily for monitoring and adjusting operations, for example, in the course of servicing and maintenance operations. The fixed installation offers the advantage that the operating point of the control sensor can be readjusted at anytime by a suitable automatic circuit and that the driver is informed at all times about the condition of the catalyst. It is thereby particularly advantageous not to keep the test sensor continuously in operation (probe heating) but to operate the same only intermittently, for example, after a predetermined driving performance or after a predetermined operating period in order to avoid far-reachingly the aging phenomena of the test-probe. The operating period of the test-probe should therefore generally amount to approximately 20% or less of the operating period of the control-probe. The start of operation of the test-probe may also take place by an on-board computer, which takes into consideration rotational speed, load and temperature of the engine. Such apparatus are already known, for example, for determining the servicing interval. The only sporadic testing and monitoring of the exhaust gas by means of the test-probe is quite tolerable because generally no dramatic displacement of the probe characteristic curve or a sudden deterioration of the catalytic action takes place.

The only temporary installation of the test-probe in the course of servicing operation offers the advantage that the individual vehicle does not become more expensive because in this case a test sensor with electronic circuits is used for many vehicles. A further advantage resides in the fact that the test sensor in the condition not installed in the vehicle, can be tested for proper operation in a relatively simple manner by means of corresponding test gases.

The signal determined by the test-probe may serve not only for the displacement of the operating point of the control-probe but it is also possible depending on the possibilities existing in the vehicle, for example, with a microprocessor-controlled engine, to change other exhaust gas determining parameters such as ignition instant, regulating frequency and regulating amplitude of the control probe regulating system, suction air pressure in vehicles with exhaust gas turbochargers, etc.

The advantages achievable with the present invention reside above all in the fact that it has become possible for the first time in a simple manner to be able to test the control-probe and the catalyst simultaneously but independently of one another for their operating capability and to compensate displacements of the characteristic line of the control probe by readjustment of the operating point of the control system. It is also possible to monitor the response period of the catalyst, i.e. period of time which is required by the catalyst after a cold start in order to be able to assume its function. For that purpose, the engine is started with an operationally warm test-probe and the time is measured until the amplitude magnitude of the test-probe lies within the range B.

Figure 5:
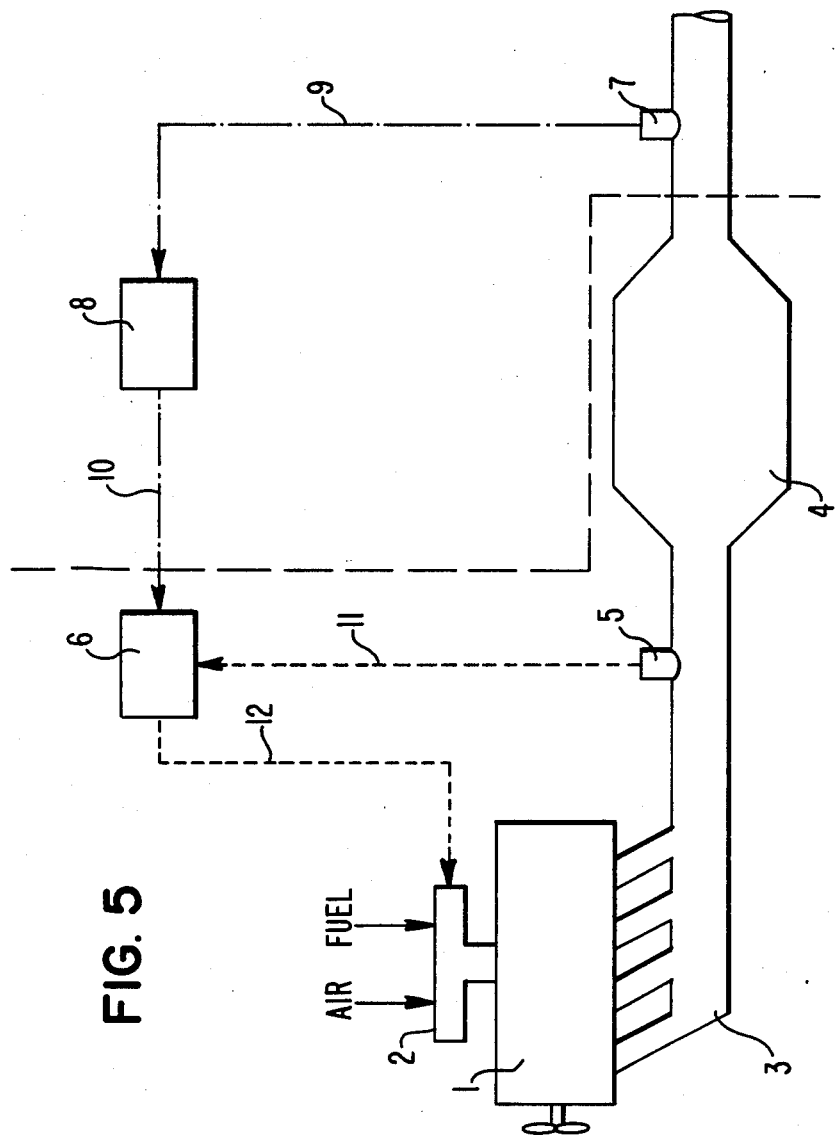

FIG. 5 illustrates schematically the present invention with an internal combustion engine 1 equipped with a fuel metering system 2 such as a carburetor or injection system and with an exhaust system 3 that includes a catalyst 4. A control probe 5 (λ-probe) is connected in the exhaust system upstream of the catalyst 4. The output of the control probe 5 is connected with the input of an electronic control device 6 by way of a line schematically indicated by reference numeral 11 while the output of the electronic control device 6 is operatively connected with the input of the fuel metering system. A λ-probe 7 (test-probe) is connected in the exhaust system downstream of the catalyst 4 for measuring the fuel-air ratio in the exhaust gases downstream of the catalyst 4. The signal in the output of the test-probe 7 is connected to an electronic device 8 for determining amplitude and average value of the signal from the test-probe 7. The output of the electronic device 8 is applied to another input of the electronic control device 6 so as to change the operating point of the control system in case of a deviation of the average value from a predetermined desired value until the test probe 7 produces a signal corresponding to the desired value. Since the components schematically illustrated in FIG. 5 are known as such in the art and involve known electronic technology, a detailed description thereof is dispensed with herein for the sake of simplicity.

While we have shown and described only one embodiment of the present invention, it is understood that the same is not limited thereto but is susceptible of numerous changes and modifications as known to those skilled in the art and we therefore do not wish to be limited to the details shown and described herein but intend to cover all such changes and modifications as are encompassed by the scope of the appended claims.

We claim:

1. A method for monitoring and adjusting catalytic exhaust gas emission control systems of internal combustion engines, comprising the steps of measuring the fuel-air-ratio in the exhaust gas by means of a control-probe, increasing respectively decreasing the fuel supply on the suction side when exceeding respectively dropping below a predetermined desired voltage of the control-probe, further converting the exhaust gas in a catalyst located in the exhaust gas stream downstream of the control-probe, measuring the fuel-air-ratio of the exhaust gas downstream of the catalyst as viewed in the flow direction by a further probe, determining the amplitude and average value of the output signal of said further probe and in case of a deviation of the average value from a predetermined desired value, changing the operating point of the control system for such length of time until the further probe has reached its desired value, and producing a signal indicating the need to exchange the catalyst when the output signal of the further probe exceeds a predetermined amplitude magnitude.

2. A method according to claim 1, wherein the further probe is operated continuously.

3. A method according to claim 1, wherein the further probe is operated intermittently.

4. An apparatus for monitoring and adjusting an exhaust gas emission control system of an internal combustion engine, comprising a catalyst means, fuel supply means for the engine, means including a control-probe for measuring the fuel-air ratio in the exhaust gas and for adjusting the fuel supply to the engine from said fuel supply means in accordance with the output of the control-probe, means including a further probe for measuring the fuel-air ratio in the exhaust gas downstream of the catalyst means and for determining the amplitude and average value of the output of said further probe, and control means for changing the operating point of the control system in case of a deviation of the average value from a predetermined desired value until the further probe reaches its desired value.

5. An apparatus according to claim 4, further comprising means for indicating the need for exchanging the catalyst means when the output of the further probe reaches a predetermined amplitude.

6. An apparatus according to claim 5, wherein both probes are λ-probes.

7. An apparatus according to claim 5, further comprising means for intermittently operating said further probe.

8. An apparatus according to claim 4, wherein said further probe is installed into the emission control system only during servicing and maintenance.

9. An apparatus according to claim 4, wherein said further probe is permanently installed into and forms part of the emission control system in a motor vehicle.

10. An apparatus according to claim 9, further comprising means for intermittently operating said further probe.

* * * * *